United States Patent Office.

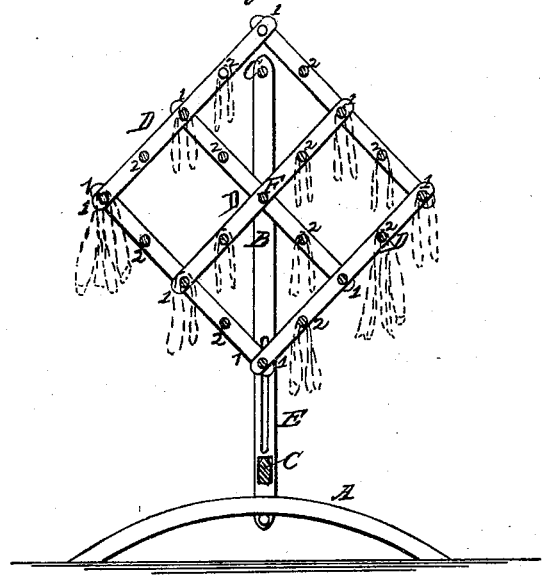
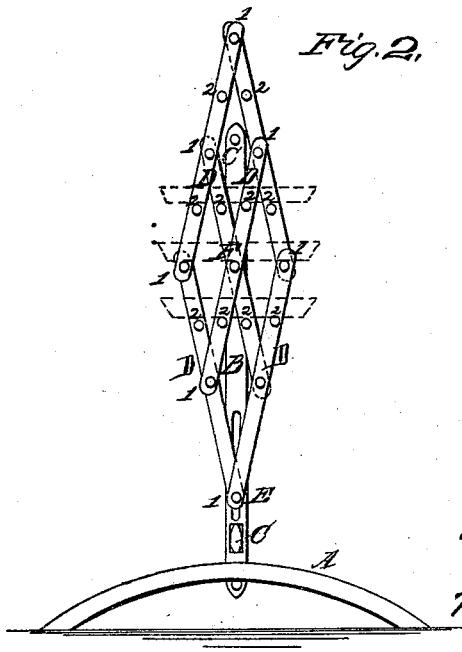

W. W. HORTON, OF KATONAH, NEW YORK.

Letters Patent No. 77,377, dated April 28, 1868.

IMPROVED RACK FOR HATS AND DISHES.

The Schedule referred to in these Letters Patent and making part of the same.

TO ALL WHOM IT MAY CONCERN:

Be it known that I, W. W. HORTON, of Katonah, in the county of Westchester, and in the State of New York, have invented a new and improved Adjustable Rack for Supporting Hats, Vessels, and other articles; and I do hereby declare that the following is a full, clear, and exact description, which will enable those skilled in the art to make and use the same, reference being had to the accompanying drawing, forming part of this specification, in which drawing—

Figure 1 is a side view, in cross-section, of a rack made according to my invention, the frame being shown expanded in a horizontal direction.

Figure 2 is also a side view, the frame being contracted in width and increased in height.

The object of this invention is to produce a rack for holding various articles, which, while it is made adjustable in height and width, is so constructed and arranged as to be capable of holding hats, pans, and other articles with flat bottoms, which can rest upon the bars of the rack, or upon boards that are supported by said bars, and also of holding cloth for drying or airing.

The article is useful for domestic and culinary purposes, as, for example, as a hat-rack, as a rack for holding pans of milk, or for drying fruit when the frame is closed and the several rods are brought near to each other, so as to form a series of shelves.

The letter A designates the base or feet from which rise standards B, that are connected at top and bottom by binding-rods C C. Within or between said standards B, I place an expansion-frame, which is composed of the several divisions D D, &c., six in number in this example, four of them forming the exterior of the frame, and two of them forming its interior.

The divisions are jointed to each other by means of rods 1, at the places where they intersect or meet each other, the rod which is placed at the intersection of the two interior divisions being designated F, and the same is made to enter the standards and support the whole frame thereon. The lower rod 1 is also extended beyond the ends of the frame, so as to enter the slots E, which are made in the lower parts of the standards, in which slots the ends of said rod move when the frame is contracted or extended, and they consequently prevent the frame from rotating on the central supporting-rod F.

The framework of the divisions D has rods 2, that go across it from side to side, and the same are so arranged with reference to each other and to the rods 1 and the rod F, that they are parallel therewith, and in folding the main frame, those rods which are on a level with each other remain level when the frame is expanded. When the frame is folded together, those rods which are on a level with each other, being brought close together, form a shelf capable of holding pans, dishes, and other articles with safety.

What I claim as new, and desire to secure by Letters Patent, is—

The combination of the feet A, standards B slotted at E, and an expansion-frame, composed of divisions D, jointed to each other, and having parallel rods 1 2, as specified.

W. W. HORTON.

Witnesses:
M. B. SILKMAN,
DENNIS KELLEHER.